United States Patent Office 2,968,653
Patented Jan. 17, 1961

---

2,968,653

PROCESS FOR PREPARING A WATER-SOLUBLE COBALT SALT AND SOLUBLE STARCH

Lyell J. Klotz, Cincinnati, Ohio, assignor to Lloyd Brothers, Inc., Cincinnati, Ohio, a corporation of Ohio No Drawing. Filed July 16, 1957, Ser. No. 672,125

3 Claims. (Cl. 260—233.3)

The present invention relates to a novel water-soluble cobalt-soluble starch compound. More specifically the invention relates to the reaction product of a water-soluble cobalt salt and soluble starch in an aqueous alkali hydroxide medium under the conditions specified below.

During the investigations leading to the present invention it was found that an aqueous solution containing both soluble starch and a soluble cobalt salt was a simple solution of both substances and that spectrophotometrically, the absorption curve was similar to that shown by the cobalt salt alone. It was also found when excess alkali hydroxide was added to the above solution containing certain proportions of soluble starch and soluble cobalt salt that marked color changes occurred without precipitation and that the spectrophotometer then showed a totally different absorption curve. It was further found that the color change began at about pH 7 and finally became blue at about pH 11, and that this reaction took place with equal ease at any temperature between 0° C. and 100° C. as well as room temperature. No reaction took place when the soluble starch was replaced with unhydrolyzed or ordinary starch.

The reaction which apparently involves the hydroxyl hydrogen atoms of the soluble starch, occurs in the manner described above so long as cobaltous chloride hexahydrate (or an equivalent of other soluble cobalt salt) does not exceed approximately one part by weight to approximately 4.5 parts by weight of soluble starch. As cobaltous chloride hexahydrate contains about 25% cobalt (Co), one part of cobaltous chloride hexahydrate contains about 0.25 part by weight of cobalt, and the cobalt to soluble starch ratio is thus about 1 to 18. The use of larger proportions of cobalt salt results in the formation of an unwanted precipitate made up of insoluble cobaltous hydroxide or its related basic derivatives. This shows the presence of excess cobalt salt or insufficient soluble starch to react with all of the cobalt. The use of smaller proportions of cobalt salt leaves some available reactive groups unreacted with the cobalt or possibly some unreacted soluble starch. In practice, to insure the reaction of all of the cobalt salt, it is generally preferred to employ a slight excess of soluble starch, e.g. 1 part by weight of cobaltous chloride hexahydrate or equivalent with about 5 parts by weight of soluble starch. Larger amounts of soluble starch can be employed if desired but as there is no advantage in having excessive amounts of soluble starch present it is usually avoided.

In general the process comprises the forming of an aqueous solution containing about 1 part by weight of cobaltous chloride hexahydrate (or other soluble salt to provide an equivalent amount of cobalt) and at least about 4.5 parts by weight of soluble starch. The amount of water can vary widely but should be sufficient to insure that both ingredients are in solution. Excessive amounts of water, however, are ordinarily avoided as they complicate the recovery problem described below, i.e. require more water-miscible organic liquid to precipitate the reaction product. Alkali hydroxide, preferably dilute alkali hydroxide such as 5–15% aqueous sodium hydroxide, is then added with stirring to the aqueous cobalt salt-soluble starch solution until the pH of the solution is about 11, i.e. between 10.5 and 11.5. A water-miscible organic liquid (lower aliphatic alcohol or acetone) is next added to the alkaline solution to precipitate the cobalt-soluble starch reaction product compound. The precipitate is then recovered, e.g. by centrifuging or by decanting off the aqueous organic liquid, preferably washed, e.g. with the precipitating organic liquid containing a little water to remove any excess alkali, inorganic salts, etc. remaining with and contaminating the precipitate. The product can also be dissolved in water and reprecipitated for further purification if desired. The washed or purified product is dried at room temperature or in an oven up to about 100° C. and finally powdered or reduced to granule size particles.

The cobalt-soluble starch compound prepared as above is practically tasteless, contains approximately 5% of cobalt and is moderately soluble in water forming solutions with a pH around 8.5–9.0. In water solution, tests with potassium thiocyanate and acetone show the presence of the cobalt ion. On treatment with acids (e.g. HCl), the blue color is discharged and the pink color of inorganic cobalt salts appears, indicating the decomposition of the compound. On treatment of a solution of the purified compound with silver nitrate and nitric acid, silver chloride does not precipitate, indicating the absence of a cobalt chloride complex.

The following specific example will serve to illustrate the invention.

*Example*

About five pounds of soluble starch are dissolved in about five gallons of warm or hot (50–75° C.) water. About one pound of cobaltous chloride hexahydrate is dissolved in about one quart of water and this solution is then mixed with the solution of soluble starch. Sufficient aqueous 10% sodium hydroxide solution is next added to the mixed solutions with vigorous stirring until the pH of the resulting reaction mixture is about pH 11. About twenty gallons of isopropanol is next added with mixing to the alkaline mixture and the resulting precipitate allowed to settle. The liquid is then decanted off, the precipitate or solid residue is broken up and washed with small portions of 90% aqueous isopropanol. The washed precipitate is finally dried at room temperature and reduced to desired granule-sized particles. This resulting blue, non-crystalline product contains about 5% by weight of cobalt and can be made up in solution form or in tablet and capsule form in accordance with standard practices in the art.

The cobalt salt employed in the present invention can be any water-soluble cobalt salt of which cobaltous chloride, cobaltous sulfate, cobaltous acetate and cobaltous aminoacetate are illustrative examples. Water-soluble cobaltous salts having a non-toxic inorganic or organic anion forming group and which form non-toxic water-soluble salts with the alkali, e.g. common salt (NaCl) formed by the use of cobaltous chloride as the cobalt salt and sodium hydroxide as the alkali (see the above example), are preferred.

The soluble starch employed in the present invention is prepared by the partial hydrolysis of starch and is a common article of commerce. It is also known as amylodextrin and amylogen (see Mercks Index, Sixth edition, 1952) and is available comercially as a white, odorless and tasteless powder. It is soluble in water, yielding slightly acidic solutions with a pH ordinarily between 4 and 6.

The alkali hydroxide employed in the present invention is selected from the group consisting of water-soluble alkali metal and alkaline earth metal hydroxides and ammonium hydroxide. Illustrative examples are sodium hydroxide, potassium hydroxide, calcium hydroxide, etc. In place of isopropanol, any water-miscible organic liquid of the so-called organic solvent type (e.g. lower aliphatic alcohols such as methanol and ethanol and ketones such as acetone) can be employed to precipitate the reaction product in the recovery step.

The cobalt-soluble starch compound of the present invention can be used to advantage in place of other forms of cobalt, e.g. in place of cobalt chloride used today, and in the same dosage units where cobalt therapy is indicated, e.g. as a erythropoietic stimulant. The compound can also be used in the same cobalt dosage in place of inorganic cobalt salts widely used today in combination with iron salts such as ferrous sulfate in the treatment of iron-deficiency anemias. The compound of the present invention has the advantage over these prior forms of cobalt which are nauseating and astringent in taste, in that it is substantially free from any taste. This is a distinct advantage, particularly when the compositions are administered in liquid solution form, as the taste of cobalt chloride and the like is so objectionable as to frequently result in anorexia, nausea and sometimes vomiting. Gastro-intestinal disturbances of this type are avoided or materially reduced by the administration of the practically tasteless compound of the present invention. In addition to providing a more palatable product, which is highly desirable where, as here, continuous treatments are normally required for relatively long periods of time, the compound of the present invention adds no additional toxic element as the soluble starch is non-toxic and readily digestible. Also, experiments with rats have shown cobaltous chloride (the cobalt salt most widely used in cobalt therapy today) to be at least about twice as toxic, based on oral intake of elemental cobalt, as the compound of the present invention. Aside from this and possibly other advantages, the present invention provides an easy and satisfactory way, particularly with patients who cannot or find it difficult to swallow tablets or capsules, of administering cobalt where cobalt therapy is indicated.

I claim:

1. The process which comprises preparing an aqueous solution of a water-soluble cobalt salt and soluble starch, the amount of salt and starch being such as to provide about 1 part by weight of cobalt to at least about 18 parts by weight of soluble starch, adding an alkali hydroxide to the cobalt salt-soluble starch solution to provide the resulting reaction mixture at a temperature between 0° C. and 100° C. with a pH of about 11 while maintaining the reaction mixture between 0° and 100° C., and recovering the resulting cobalt-soluble starch compound as a precipitate by adding a water-miscible organic liquid selected from the class consisting of lower aliphatic alcohols and acetone to the aqueous alkaline reaction mixture.

2. The process which comprises preparing an aqueous solution of cobaltous chloride hexahydrate and soluble starch in a ratio of about 1 part by weight of cobaltous chloride hexahydrate to about 4.5 parts by weight of soluble starch, adding sodium hydroxide to the solution to provide the resulting reaction mixture at a temperature between 0° C. and 100° C. with a pH of about 11 while maintaining the reaction mixture between 0° and 100° C., and recovering the resulting cobalt-soluble starch reaction product as a precipitate by adding a water-miscible organic liquid selected from the class consisting of lower aliphatic alcohols and acetone to the aqueous alkaline reaction mixture.

3. The process which comprises dissolving about 5 parts of soluble starch in water, dissolving about 1 part of cobaltous chloride hexahydrate in water, mixing the solutions, adding a dilute aqueous solution of sodium hydroxide with stirring to the soluble starch-cobaltous chloride solution until the pH of the resulting reaction mixture at a temperature between 0° C. and 100° C. is about 11 while maintaining the reaction mixture between 0° and 100° C., adding sufficient isopropanol to the alkaline reaction mixture to precipitate the resulting reaction product, separating the resulting cobalt-soluble starch precipitate from the reaction liquor, washing the precipitate with aqueous isopropanol and drying the precipitate.

References Cited in the file of this patent

UNITED STATES PATENTS

| | | |
|---|---|---|
| 2,518,135 | Graver | Aug. 8, 1950 |
| 2,609,368 | Graver | Sept. 2, 1952 |
| 2,671,780 | Graver et al. | Mar. 9, 1954 |